United States Patent [19]

Yang

[11] Patent Number: 5,453,643
[45] Date of Patent: * Sep. 26, 1995

[54] CONTROLLABLE COMPOUND VOLTAGE DC/AC TRANSFORMING CIRCUIT

[76] Inventor: Tai-Her Yang, 5-1 Taipin St., Si-Hi Town, Dzan-Hwa, Taiwan

[*] Notice: The portion of the term of this patent subsequent to Oct. 4, 2011 has been disclaimed.

[21] Appl. No.: 34,715

[22] Filed: Mar. 22, 1993

[51] Int. Cl.$^6$ .................................. H02J 1/10
[52] U.S. Cl. ........................... 307/71; 307/80; 307/85; 363/95; 363/98; 363/132
[58] Field of Search .................... 363/17, 28, 95, 363/96, 98, 132, 136; 307/71, 80, 85

[56] References Cited

U.S. PATENT DOCUMENTS

| | | | |
|---|---|---|---|
| 3,487,229 | 12/1969 | Krausz | 307/85 |
| 4,597,026 | 6/1986 | Santurtun et al. | 363/17 |
| 4,742,243 | 5/1988 | Zabar et al. | 307/85 |
| 4,825,028 | 4/1989 | Smith | 363/98 |
| 4,885,447 | 12/1989 | Sanchez Gonzalez | 363/132 |
| 4,969,076 | 11/1990 | Schutten et al. | 363/17 |
| 5,267,138 | 11/1993 | Shores | 363/98 |
| 5,352,931 | 10/1994 | Yang | 307/81 |

*Primary Examiner*—Jeffrey L. Sterrett
*Attorney, Agent, or Firm*—Leonard Bloom

[57] ABSTRACT

In a controllable compound voltage high-efficiency DC/AC transforming circuit, including a plurality of identical battery units which are arranged in parallel and/or serial arrangement to provide a step output voltage, an improvement comprising a bridge type solid state switch circuit for the output voltage polarity exchange and AC frequency control. The bridge type solid state switch circuit is controlled by a central control unit.

2 Claims, 2 Drawing Sheets

5,453,643

CONTROLLABLE COMPOUND VOLTAGE DC/AC TRANSFORMING CIRCUIT

FIELD OF THE INVENTION

The present invention relates to DC/AC transforming circuits with controllable output, and more specifically, to DC/AC transforming circuits with controlled polarity of output voltage.

BACKGROUND OF THE INVENTION

Power supplies are typically used to convert alternating current (AC) power to direct current (DC) power, and to convert DC power to AC power for different purposes. Power (voltage, current) obtained on output terminals is to meet requirements of a load consuming this output power (voltage, current).

Different power supplies are known in the art. For instance, as described in Ser. No. 08/032,132, now U.S. Pat. No. 5,352,931 and Ser. No. 08/032,131, both invented by the same inventive entity as the present invention, the power supply includes a plurality of identical battery units interconnected by respective switch units. Each switch unit is controlled by a central control unit in order to re-arrange the battery units in series and/or parallel arrangement and to obtain a desired step voltage on the output terminals of the power supply.

It would be highly desirable to provide a power supply with polarity exchange function and AC frequency control, and also the power supply where the step voltage could be linearized or PWM controlled.

SUMMARY OF THE INVENTION

It is, therefore, an object of the present invention to provide a controllable compound voltage high-efficiency DC/AC transforming circuit having a step voltage output and linear voltage output, both low ripple voltage outputs.

It is another object of the present invention to provide a power supply with polarity exchange function and AC frequency control.

According to the present invention, a controllable compound voltage DC/AC transforming circuit comprises at least six substantially identical battery units, which are interconnected by a central control unit for connecting the battery units in a series and parallel arrangement for providing an output voltage on a pair of output terminals having a required load in a wide range of output voltages. The output terminals include positive and negative output terminals. Each battery unit has respective positive and negative terminals and a terminal voltage. Said circuit further comprises five switch units, a first switch unit between the negative terminal of the first unit battery unit and the positive terminal of the second battery unit, a second switch unit between the negative terminal of the second battery unit and the positive terminal of the third battery unit, a third switch unit between the negative terminal of the third battery unit and the positive terminal of the fourth battery unit, a fourth switch unit between the negative terminal of the fourth battery unit and the positive terminal of the fifth battery unit, and a fifth switch between the negative terminal of the fifth battery unit and the positive terminal of the fifth battery unit. Each switch unit has one of a normal position and an actuated position. At least one of said five switch units is actuated by the central control unit in order to provide a respective serial and/or parallel connection between said battery units. Five pairs of diodes (each of the diodes has respective positive and negative terminals), each is connected to each of said five switch units. The negative terminals of all respective first diodes are connected to ground, and the positive terminals of all respective second diodes are connected to the positive terminal of the pair of the output terminals. In the normal position of the respective first, second, third, fourth, and fifth switch units, the respective first, second, third, fourth, fifth and sixth battery units are in parallel, and output voltage is the terminal voltage of each solar battery. If the second and the fourth switch units are actuated, the first and the second battery units, the third and the fourth battery units, and the fifth and the sixth battery units, respectively, are connected in series and the series-connected first and second battery units are in parallel with the series-connected third and fourth battery units, and are in parallel with the series-connected fifth and sixth battery units, and the output voltage is twice the terminal voltage of each battery unit. When said five switch units are actuated, the respective first, second, third, fourth, fifth and sixth battery units are connected in series, and the output voltage is six times the terminal voltage of each battery unit. An improvement comprises a first, a second, a third and a fourth solid state switch unit which are interconnected in a bridge-type connection. The bridge-type connection has a pair of bridge input terminals and a pair of the bridge output terminals. Said pair of bridge input terminals is connected to said positive and negative output terminals, respectively, and said first, second, third, and fourth solid state switch units are actuated by the central control units such that when respective two of said first, second, third, and fourth solid state switch units are ON, other two of said first, second, third, and fourth solid state switch units are OFF, thereby alternating a polarity of the output voltage.

Viewing in another aspect of the present invention, a controllable compound voltage DC/AC transforming circuit comprises at least four battery units of substantially equal voltage and includes first, second, third and fourth units. Each of the battery units has a substantially equal terminal voltage and each of the battery units has respective positive and negative terminals. A plurality of switch units includes a first switch unit between the first and second battery units, a second switch unit between the second and third battery units, and a third switch unit between the third and fourth battery units. Each of the switch units has a first and a second contacts. A plurality of diodes includes first, second, third, fourth, fifth and sixth diodes. Each of the diodes has respective positive and negative terminals. A pair of output terminals includes a positive output terminal and a negative output terminal, respectively. The positive terminal of the first battery unit is connected to the first contact of the first switch unit and to the negative terminal of the first diode, respectively. The negative terminal of the first battery unit is connected to the negative terminal of the second diode, to the negative terminal of the fourth diode, and to the respective output terminal. The positive terminal of the second battery unit is connected to the positive terminal of the first diode, to the negative terminal of the third diode, and to the first contact of the second switch unit, respectively. The negative terminal of the second battery unit is connected to the second contact of the first switch unit and to the positive terminal of the second diode. The positive terminal of the third battery unit is connected to the negative terminal of the fifth diode and to the first contact of the third switch unit. The negative terminal unit of the third battery unit is connected to the second contact of the second switch, to the negative terminal of the sixth diode, and to the positive terminal of the fourth diode, respectively. The positive terminal of the fourth battery unit is connected to the positive terminal of the fifth diode, to the positive output terminal of the third diode, and to the positive output terminal. The negative terminal of the fourth battery unit is connected to the second contact of the third switch unit, and to the positive output terminal of the sixth diode. In a normal position of the respective first, second and third switch unit, the respective first, second, third and fourth battery units are in parallel, and the voltage at the output terminals is the terminal voltage of each battery unit. When the first and third switch units are actuated, the first and second battery units are connected in series, the third and fourth battery units are connected in series, the series-connected first and second battery units are in parallel with the series-connected third and fourth battery units, and the voltage at the output terminals is twice the terminal voltage of each battery unit. When the first, second and third switch units are actuated, the first, second, third and fourth battery units are all in series, and the voltage at the output terminals is four times the terminal voltage of each battery unit. An improvement comprises a first, a second, a third and a fourth solid state switch units which are interconnected in a bridge-type connection. Said bridge-type connection has a pair of bridge input terminals and a pair of bridge output terminals. The bridge input terminals are connected to said positive and negative output terminals, respectively. And said first, second, third, and fourth solid state switch units are actuated by the central control units such that when respective two of said first, second, third, and fourth solid state switch units are ON, other two of said first, second, third, and fourth solid state switch units are OFF, thereby alternating a polarity of the output voltage.

These and other objects of the present invention will become apparent from a reading of the following specification taken in conjunction with the enclosed drawings.

DETAILED DESCRIPTION OF THE INVENTION

Figure 1:
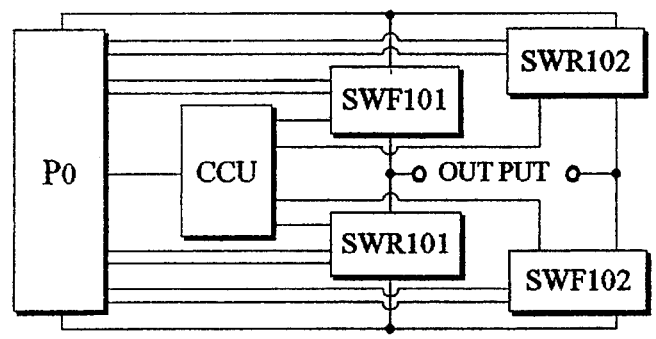
FIG. 1 is a block diagram showing the structure of bridge type alternating circuit for controllable compound voltage DC/AC transforming circuit.

The present controllable compound voltage DC/AC transforming circuit relates to a power supply with alternating compound voltage output including a battery set and solid state switch units connected between the batteries. A central control unit (CCU) accepts orders from operating command input unit, controls solid state switch units and regulates the output voltage/current in order to obtain a desired value of the output voltage/current. Solid switch units are PWM regulated for linearization of the output voltage and for providing a low ripple voltage output. A bridge type switch unit provides a polarity alternation. Referring to FIG. 1, the circuit of the present invention comprises: a central control unit (CCU) consisted of a microprocessor or a logic circuit and a driving interface circuit for driving power unit to alternate solid switch unit, and solid switch units SWF101, SWF102, SWR101 and SWR102 of polarity alternating circuit; the polarity exchange circuit including four switch units (preferably, solid state, but also can include thrysistors or transistors or electromechanical switches) SWF101, SW102, SWR101, SWR102 bridge connected in bridge, and bridge output terminals connected to the load and if necessary a wave trueing circuit (not shown) such as LC resonance trueing circuit, and bridge input terminals connected to the said battery set or compound voltage driving circuit $P_0$ consisting of a plurality of independent DC power supplies; the bridge type switch is controlled by the CCU, therefore when two switch units SWF101, SWF102 are ON, an output has a current positive polarity; when the other two switch units SWR101, SWR102 are ON, an output has a negative polarity; a compound voltage supply unit $P_0$ including two or more battery units, solid switch units connected therebetween, and shunt diodes. When the CCU controls the bridge type circuit for output voltage (current) polarity alternation, each output signal also synchronously controls the compound voltage supply unit $P_0$ to provide multi-step voltage of approximately necessary wave form, that is during the output of each polarity, its output wave is changing from zero to low, from low to high, from high to low and then to zero, wherein said low and high values are step voltage of the power supply, and then changing the polarity for repeating the aforesaid voltage cycling to form approximate sined AC output from multi-step output step voltage.

During the operation of aforesaid system, it has following functions and features:

(1) It may provide voltage output in a wide range for selection by symmetrically alternating the switch units.

(2) Circuit may have an output of a single phase or of different phases.

Besides, owing to requirements of a load, the output voltage/current may include triangular wave, square wave, dent wave, integral wave, differential wave to meet a variety of purposes. We may use the CCU to control directly a DC pulse output of approximately required wave form against compound voltage output sequence, or synchronously match the polarity exchange bridge type circuit for aforesaid specific AC output.

Figure 2:
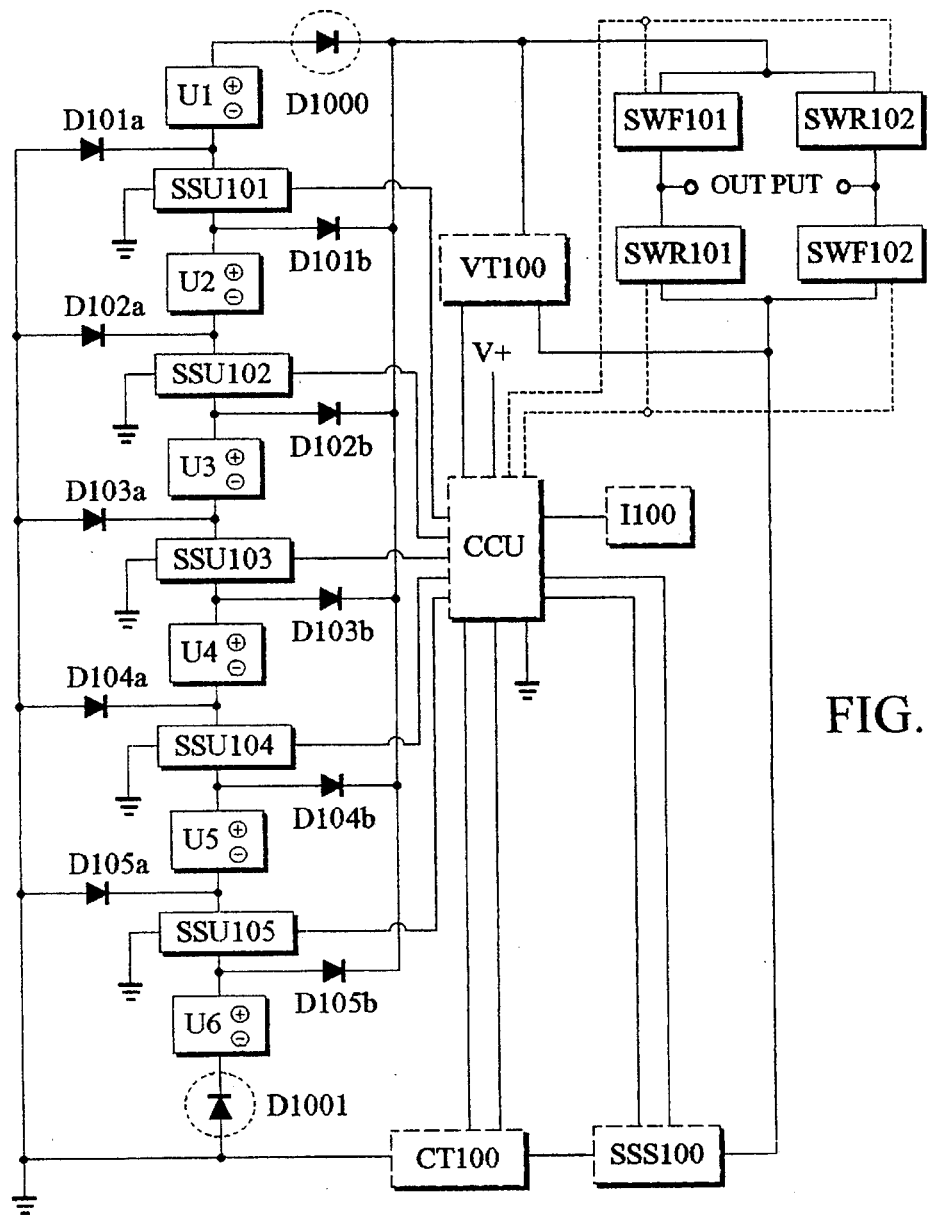
FIG. 2 is a first embodiment of $P_0$ shown in FIG. 1.

The compound voltage power supply unit $P_0$ may be a common divider circuit shown in FIG. 2, including two or more battery units ($U_1$–$U_6$) of same voltage and capacity or at least same voltage, including primary, secondary battery, solar battery, fuel battery, or thermal battery. The solid switch unit (SSU101– SSU105) is located between each two battery units, by respective first and second contacts. The battery units may be arranged in series of parallel or series/parallel arrangement. Diode D101$b$–D105$a$, D105$b$) a plurality of diodes are connected to respective terminals of the battery units and to respective contacts of the switch units.

Diodes D1000 and D1001 of aforesaid circuit are connected between voltage units for equalizing purpose when battery sets are connected in parallel (subject to the requirement).

The CCU controls the switch units (SSU101–SSU105), such that, when:

(1) switch units SSU101–SSU105 are fully opened, the battery unit $U_1$–$U_6$ are connected in series;

(2) switch units SSU101–SSU105 are fully closed, the battery units $U_1$–$U_6$ are in parallel arrangement;

(3) respective switch units are open, respective switch units are closed, thereby providing parallel/series arrangement between the respective battery units.

Referring again to FIG. 2, the system includes six battery units $U_1$–$U_6$ and five switch units SSU101–SSU105 respectively located between each two battery units, and each switch unit has diodes D101a–D105a which are located according to the aforesaid principle. When switch units SSU101–SSU105 closed, series voltage output from all battery units $U_1$–$U_6$ is 6×EB (where EB is a terminal voltage of each battery unit). When switch unit SSU103 turned OFF while SSU101, SSU102, SSU104, SSU105 ON, the output voltage is 3×EB, i.e. battery units connected in series of three by three and then connected in parallel to each other; when switch units SSU102 and SSU104 turned OFF while SSU101, SSU103, SSU105 turned ON, the output voltage is 2×EB, i.e. battery unit connected in series each two by two and then each pair of battery units connected in parallel to each other; when SSU101–SSU105 all turned OFF, the output voltage is EB, i.e. all battery units $U_1$–$U_6$ are connected in parallel. If the system consisted of 24 voltage units, the output voltage would be as follows: 1×EB, 2×EB, 3×EB, 4×EB, 6×EB, 8×EB, 12×EB, 24×EB. If the system consisted of 36 voltage units, the output voltage would take the following values: 1×EB, 2×EB, 3×EB, 4×EB, 6×EB, 9×EB, 12×EB, 18×EB, 36×EB, and so on. The aforesaid switch units can be controlled normally and by means of the CCU and command input unit I100. Further linearization or PWM type control of the output Voltage includes a direct output microadjustment of the step output voltage by means of linear solid state switch devices, on adjustment by means of driving current controlled by CCU, or PWM control.

Figure 3:
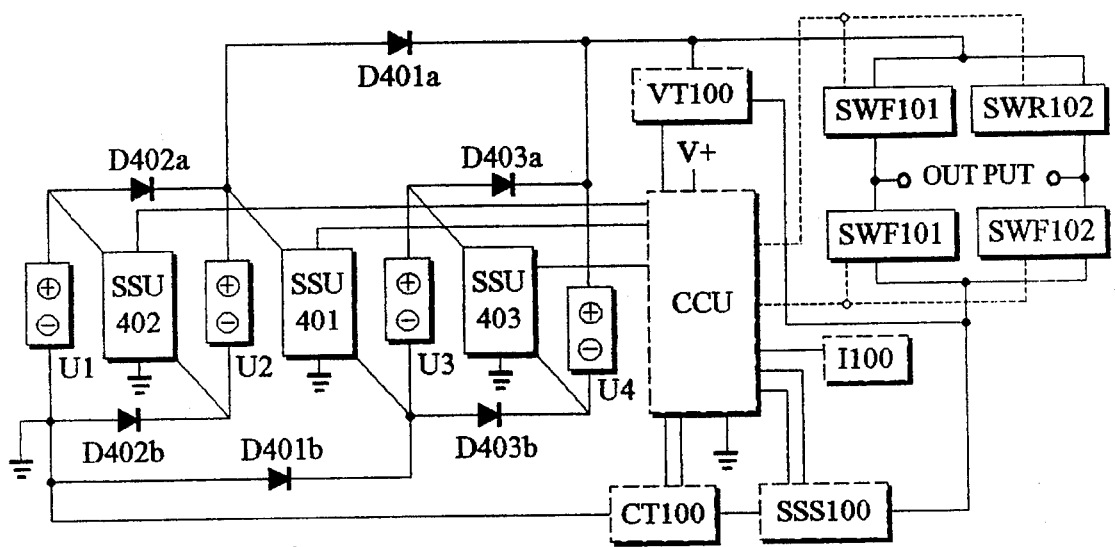
FIG. 3 is a second embodiment of $P_0$ shown in FIG. 1.

Referring to FIG. 3, another implementation of the present invention includes two or more battery units of the same voltage and capacity, or at least same voltage to change their series and parallel arrangement by means of connected between respective battery units switch units SSU401–SSU403. Connection of each switch unit SSU401–SSU403 and shunt diodes D401a, D401b–D403a, D403b is parallel while diodes suppress voltage difference during units rearrangement. The CCU accepts instructions from the command input unit I100 (shown in FIG. 3) to control solid state switch units SSU401–SSU403 for adjusting output voltage or setting output limit value. The circuit for PWM type adjustment of output voltage provides low ripple output voltage.

When SSU401, SSU402, SSU403 all are not active, battery units $U_1$–$U_4$ all are connected in parallel and the output voltage is equal to 1×battery unit voltage.

When SSU402, SSU403 are active, battery units $U_1$ and $J_2$, $U_3$ and $U_4$ are in series and then in parallel connection each to other, and the output voltage is $2^1$×battery unit voltage.

When SSU401, SSU402, SSU403 all are active, battery units $U_1$–$U_4$ are all in series, and the output voltage is $2^2$×battery unit voltage.

Figure 4:
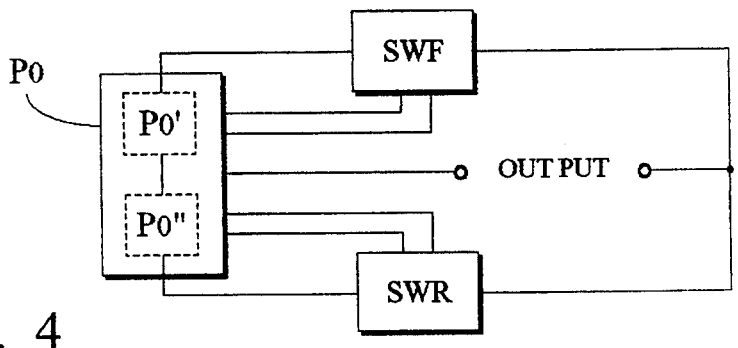
FIG. 4 is a block diagram showing bridge type alternating circuit constructed from the present controllable compound voltage DC/AC transforming circuit having intermediate tap dual $P_0$.
Figure 5:
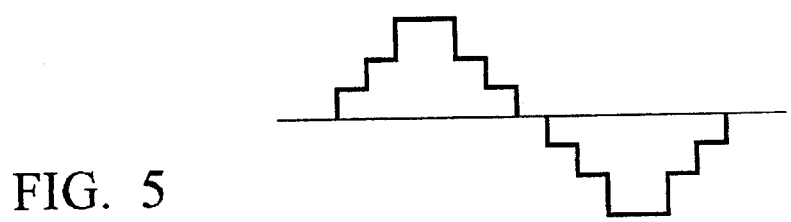
FIG. 5 is a diagram of output wave obtained at the output terminal of the controllable compound voltage DC/AC transforming circuit of the present invention.

Aforesaid circuit shown in FIGS. 2, 3 may be designed as a bridge type circuit comprising electrical elements with intermediate taps and two switch devices (as shown in FIG. 4). Said bridge type switch device of FIG. 4 may include two units, one unit SWF series with positive end of power supply unit and the second unit SWR series with negative end of power supply unit, and then both connected to the other end of the load whereby polarity alternating for the load voltage is accomplished through turning aforesaid two switch devices ON/OFF alternatively, and in cooperation with relative DC compound voltage power supply units appearing from low to high and then to low again during each half cycling to form approximately sine AC output. The diagram of output voltage is shown in FIG. 5.

Output circuit may be further connected with a current telemeter CT100 for measuring output current value that is to be fed back to the CCU for controlling solid switch relatively subject to the command from the input unit I100 or the CCU built-in setting value, and the output end may be paralleled connected with a voltage telemeter VT100 for measuring output voltage value that is to be fed back to the CCU for controlling solid switch. Like the conventional steady circuit, the circuit of the present invention is set up with a standard potential not only for regulating voltage fluctuation due to the load unsteadiness but also for regulating of load side voltage fluctuation due to unsteady voltage of power supply.

Based on aforesaid statement, the present invention relates to a DC power supply with controllable output step voltage improved by a synchronously controlled bridge type output circuit for attenuation the polarity of the output voltage.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. In a controllable compound voltage DC/AC transforming circuit, comprising at least six substantially identical battery units, including first, second, third, fourth, fifth and sixth battery units, which are interconnected by a central control unit for connecting the battery units in a series and parallel arrangement for providing an output voltage on a pair of output terminals having a required load in a wide range of output voltages, the output terminals including positive and negative output terminals, respectively, each battery unit having respective positive and negative terminals and a terminal voltage, said circuit further comprising five switch units, including a first switch unit between the negative terminal of the first unit battery unit and the positive terminal of the second battery unit, a second switch unit between the negative terminal of the second battery unit and the positive terminal of the third battery unit, a third switch unit between the negative terminal of the third battery unit and the positive terminal of the fourth battery unit, a fourth switch unit between the negative terminal of the fourth battery unit and the positive terminal of the sixth battery unit, and a fifth switch between the negative terminal of the fifth battery unit and the positive terminal of the sixth battery unit, each switch unit having one of a normal position and an actuated position, wherein at least one of said five switch units is actuated by the central control unit, thereby providing a respective serial and parallel connection between said battery units, five pairs of diodes, each pair having first and second diodes, each of the diodes having respective positive and negative terminals, each pair of the diodes being connected to a respective one of said five switch units; the negative terminals of all respective first diodes being connected to ground, and the positive terminals of all respective second diodes being connected to the positive terminal of the pair of output terminals, wherein in the normal position of the respective first, second, third, fourth, and fifth switch units, the respective first, second, third, fourth, fifth and sixth battery units are in parallel, and output voltage is the terminal voltage of each battery unit; wherein, when the first, third and fifth switch units are actuated, the first and the second battery units, the third and the fourth battery units, and the fifth and the sixth battery unit, respectively, are connected in series and the series-connected first and second battery units are in parallel with the series-connected third and fourth battery units, and are in parallel with the series-connected fifth and sixth battery units, and the output voltage is twice the terminal voltage of each battery unit; wherein, when said five switch units are actuated, the respective first, second, third, fourth, fifth and sixth battery units are connected in series, and the output voltage is six times the terminal voltage of each battery unit, an improvement comprising a first, a second, a third and a fourth solid state switch units, said first, second, third, and fourth solid state switch units being interconnected in a bridge-type connection, said bridge-type connection having a pair of bridge input terminals and a pair of the bridge output terminals, said pair of bridge input terminals being connected to said positive and negative output terminals, respectively, and said first, second, third, and fourth solid state switch units being actuated by the central control unit such that when respective two of said first, second, third, and fourth solid state switch units being on, other two of said first, second, third, and fourth solid state switch units being off, thereby alternating a polarity of the output voltage.

2. In a controllable compound voltage DC/AC transforming circuit, comprising at least four battery units of substantially equal voltage and including first, second, third and fourth battery units, respectively, each of the battery units having a substantially equal terminal voltage and each of the battery units having respective positive and negative terminals, a plurality of switch units including a first switch unit between the first and second battery units, a second switch unit between the second and third battery units, and a third switch unit between the third and fourth battery units, respectively, each of the switch units having a first and a second contacts, a plurality of diodes including first, second, third, fourth, fifth and sixth diodes, respectively, each of the diodes having respective positive and negative terminals, a pair of output terminals including a positive output terminal and a negative output terminal, respectively, means for connecting the positive terminal of the first battery unit to the first contact of the first switch unit and to the negative terminal of the first diode, respectively, means for connecting the negative terminal of the first battery unit to the negative terminal of the second diode, to the negative terminal of the fourth diode, and to the negative output terminal, respectively, means for connecting the positive terminal of the second battery unit to the positive terminal of the first diode, to the negative terminal of the third diode, and to the first contact of the second switch unit, respectively, means for connecting the negative terminal of the second battery unit to the second contact of the first switch unit, to the positive terminal of the second diode, respectively, means for connecting the positive terminal of the third battery unit to the negative terminal of the fifth diode and to the first contact of the third switch unit, respectively, means for connecting the negative terminal of the third battery unit to the second contact of the second switch unit, to the negative terminal of the sixth diode, and to the positive terminal of the fourth diode, respectively, means for connecting the positive terminal of the fourth battery unit to the positive terminal of the fifth diode, to the positive output terminal of the third diode, and to the positive output terminal, respectively, means for connecting the negative terminal of the fourth battery unit to the second contact of the third switch unit, and to the positive output terminal of the sixth diode, respectively; wherein in a normal position of the respective first, second and third switch unit, the respective first, second, third and fourth battery units are in parallel, and the voltage at the output terminals is the terminal voltage of each battery unit; wherein, when the first and third switch units are actuated, the first and second battery units are connected in series, the third and fourth battery units are connected in series, the series-connected first and second battery units are in parallel with the series-connected third and fourth battery units, and the voltage at the output terminals is twice the terminal voltage of each battery unit; and wherein, when the first, second and third switch units are actuated, the first, second, third and fourth battery units are all in series, and the voltage at the output terminals is four times the terminal voltage of each battery unit, an improvement comprising a first, a second, a third and a fourth solid state switch units, said first, second, third and fourth solid state switch units being interconnected in a bridge-type connection, said bridge-type connection having a pair of bridge input terminals and a pair of bridge output terminals, said pair of bridge input terminals being connected to said positive and negative output terminals, respectively, and said first, second, third, and fourth solid state switch units being actuated by the central control unit such that when respective two of said first, second, third, and fourth solid state switch units being on, other two of said first, second, third, and fourth solid state switch units being off, thereby alternating a polarity of the output voltage.

* * * * *